US010624270B2

(12) United States Patent
Gresset et al.

(10) Patent No.: US 10,624,270 B2
(45) **Date of Patent: *Apr. 21, 2020**

(54) WEB WRAP APPARATUS WITH SEPARATOR AND STRIPPER THEREFOR

(75) Inventors: Pascal Gresset, Pirey (FR); Emmanuel Chapon, Velet (FR)

(73) Assignee: DEERE & COMPANY, Moline, IL (US)

(*) Notice: Subject to any disclaimer, the term of this patent is extended or adjusted under 35 U.S.C. 154(b) by 324 days.

This patent is subject to a terminal disclaimer.

(21) Appl. No.: 13/234,898

(22) Filed: Sep. 16, 2011

(65) Prior Publication Data

US 2012/0240520 A1 Sep. 27, 2012

(30) Foreign Application Priority Data

Sep. 16, 2010 (EP) .................................... 10177082

(51) Int. Cl.
*A01F 15/07* (2006.01)
*B26F 3/02* (2006.01)

(52) U.S. Cl.
CPC ............ *A01F 15/0715* (2013.01); *B26F 3/02* (2013.01); *A01F 2015/0725* (2013.01); *Y10T 225/393* (2015.04)

(58) Field of Classification Search
CPC ................ A01F 15/071; A01F 15/0715; A01F 2015/072; A01F 2015/0725; B26D 7/14; B26F 3/02; B65H 35/00; B65H 35/0006; B65H 35/04; B65H 35/06; Y10T 83/2135; Y10T 83/2137; Y10T 83/2142; Y10T 83/2144; Y10T 83/2146; Y10T 83/2148; Y10T 83/215; Y10T 83/2155; Y10T 83/2157; Y10T 83/2159; Y10T 83/2163; Y10T 83/2166; Y10T 83/2168; Y10T 83/217; Y10T 83/242; Y10T 83/889; Y10T 83/896; Y10T 83/902; Y10T 225/30; Y10T 225/393
USPC .................. 83/129, 130, 132–136, 138–140, 83/142–145, 648–650; 225/93, 106
See application file for complete search history.

(56) References Cited

U.S. PATENT DOCUMENTS 3,277,846 A * 10/1966 Kesselman .................. 99/450.2
4,344,610 A * 8/1982 Jeschke et al. ................... 270/6
5,581,973 A * 12/1996 Underhill ............ A01F 15/0715 53/118

(Continued)

FOREIGN PATENT DOCUMENTS

| | | | |
|---|---|---|---|
| DE | 19539297 C1 | 4/1997 | |
| EP | 0 766 912 B1 * | 6/2001 | |
| EP | 2 113 165 A1 * | 4/2009 | ......... A01F 15/0715 |

OTHER PUBLICATIONS

European Patent Office, Extended European Search Report in Application No. 10177082 dated Apr. 1, 2011.

*Primary Examiner* — Clark F Dexter
(74) *Attorney, Agent, or Firm* — Klintworth & Rozenblat IP LLP

(57) ABSTRACT

A web wrap apparatus is provided having a separator with a separating edge and a feeder transporting web to a bale chamber. In order to keep the separating edge free of dirt, web fibers, etc. a stripper is connected to the feeder, which during a relative movement with respect to the separator strips along the separating edge and removes any particles sticking thereto.

19 Claims, 9 Drawing Sheets

(56) References Cited

U.S. PATENT DOCUMENTS 5,581,974 A * 12/1996 Underhill et al. .. A01F 15/0715 53/118
5,581,976 A * 12/1996 Underhill ............ A01F 15/0715 53/399
6,272,816 B1 8/2001 Viaud et al.
6,622,463 B1 9/2003 Anstey et al.
7,430,959 B2 10/2008 Routledge
9,016,032 B2 * 4/2015 Chapon et al. ....... A01F 15/071 53/203
2007/0157556 A1 * 7/2007 Feraboli et al. .... A01F 15/0715 53/399
2007/0267801 A1 * 11/2007 Wakabayashi et al. ... 270/52.17
2008/0022649 A1 * 1/2008 De Gersem ......... A01F 15/0715 56/341
2010/0329768 A1 * 12/2010 Watanabe et al. ............ 400/621
2012/0240517 A1 * 9/2012 Chapon et al. ..... A01F 15/0715 53/203

* cited by examiner 10
18
22
14
26
32
30
28
20
16
24
12

WEB WRAP APPARATUS WITH SEPARATOR AND STRIPPER THEREFOR

FIELD OF THE INVENTION

This invention relates to a web wrap apparatus with a feeder and a separator provided with a separating edge, the feeder and the separator being moveable relative to one another.

BACKGROUND OF THE INVENTION

EP 766 912 discloses a round baler having a net feed device, moveable between a waiting position and a feeding position and a knife for the net.

The problem this invention is based on is seen in the fact, that occasionally fibers of the net or other material build up on the edge of the knife and prevent a clean cut of the net.

SUMMARY OF THE INVENTION

By using a stripper according to the invention, fibers or any other material sticking or hanging on the separating edge are removed. Dimensions, location, the way the stripper is fixed, etc. can be selected such that a stripping action is performed depending on the expected dirt to be removed. The stripper could be attached to the feeder in a fixed or moveable way under a bias.

Tolerances need not be too tight if the stripper is elastic and flexible and will flex when it hits the separating edge and stays in close contact. While plastic and rubber are preferred, sheet metal or even wood would work as well.

A brush of Nylon fibers or the like working as a stripper has the advantage of being highly flexible and thus insensitive to varying dimensions, and would also have a stronger cleaning effect, since a brush consists of a multitude of strippers.

Since dirt, fibers, etc. sometimes are not easy to remove, a wiping movement in different directions may be more effective.

BRIEF DESCRIPTION OF THE DRAWINGS

The preferred embodiments of the invention are described in detail below with reference to the accompanying drawings wherein.

DESCRIPTION OF THE PREFERRED EMBODIMENT

Figure 1:
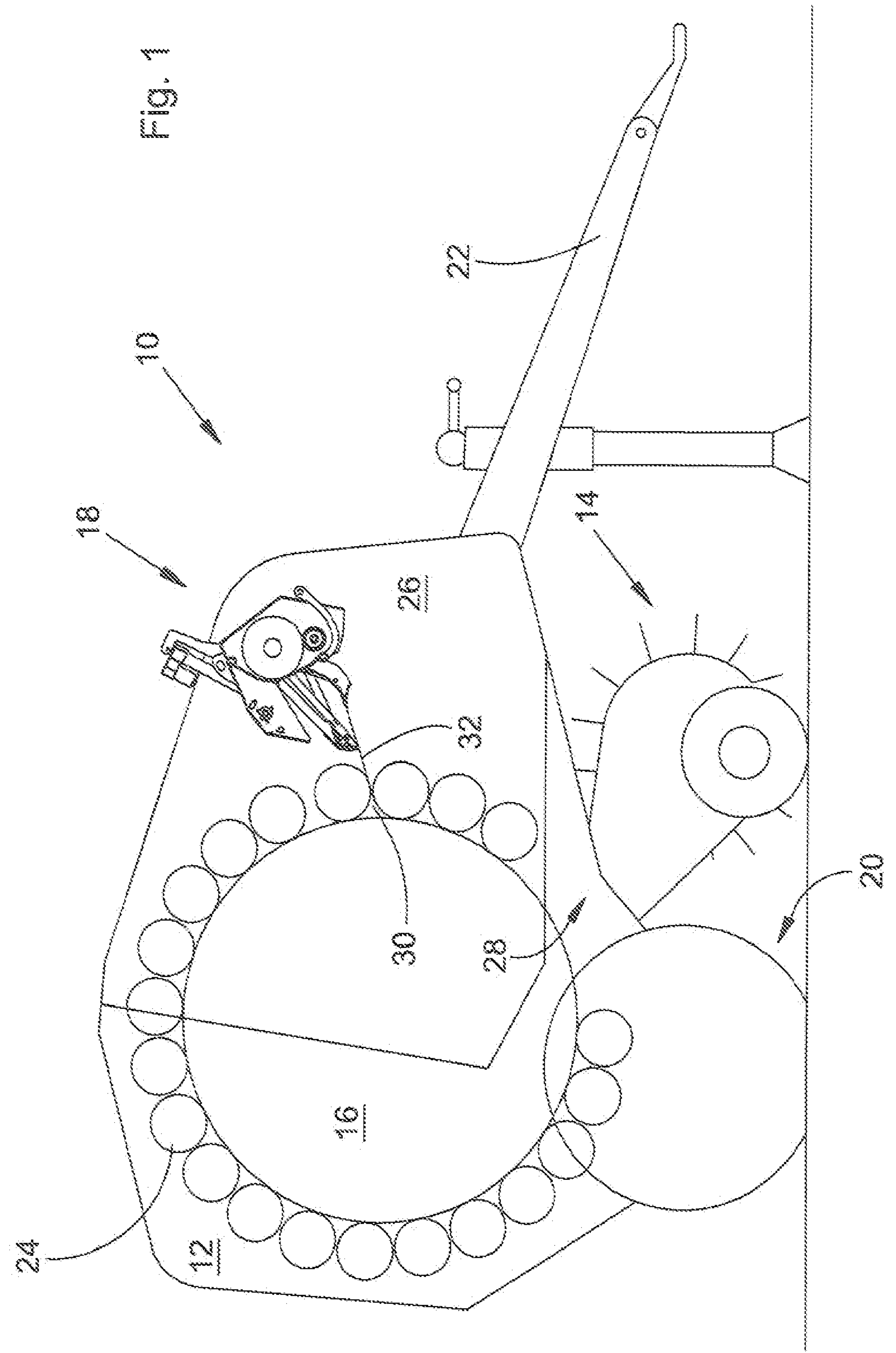
FIG. 1 is a round baler in schematic side view provided with a web wrap apparatus.

FIG. 1 shows a round baler 10, which has a chassis 12, a pick-up 14, a bale chamber 16, a web wrap apparatus 18, an axle with wheels 20, a tongue 22 and pressing elements 24.

The round baler 10 is of ordinary kind in a fix chamber version, but could also be a variable chamber baler.

The chassis 12 rests on the axle with the wheels 20, carries the pick-up 14 and can be connected to a tractor or the like by way of the tongue 22. The chassis 12 has one or multiple part side walls 26, which are spaced apart from one another to receive between them the bale chamber 16, all or part of the web wrap apparatus 18 and the pressing elements 24.

The pick-up 14 picks up crop from the ground and delivers it to the bale chamber 16 through a crop inlet 28 between the pressing elements 24.

The bale chamber 16 is covered substantially by the pressing elements 24 on the circumference and by the side walls 26 on the face side. Beside the crop inlet 28 a gap 30 is provided between the pressing elements 24, through which the web 32 may be fed into the bale chamber 16. The bale chamber 16 serves to form a cylindrical bale of hay, straw or the like, which will be covered by the web 32 of plastic, net, paper or similar material. The pressing elements 24 in this embodiment are in the form of steel rolls rotatably received in the sidewalls 26 and extending perpendicular to them. These pressing elements 24 are substantially arranged on a circle.

Figure 2:
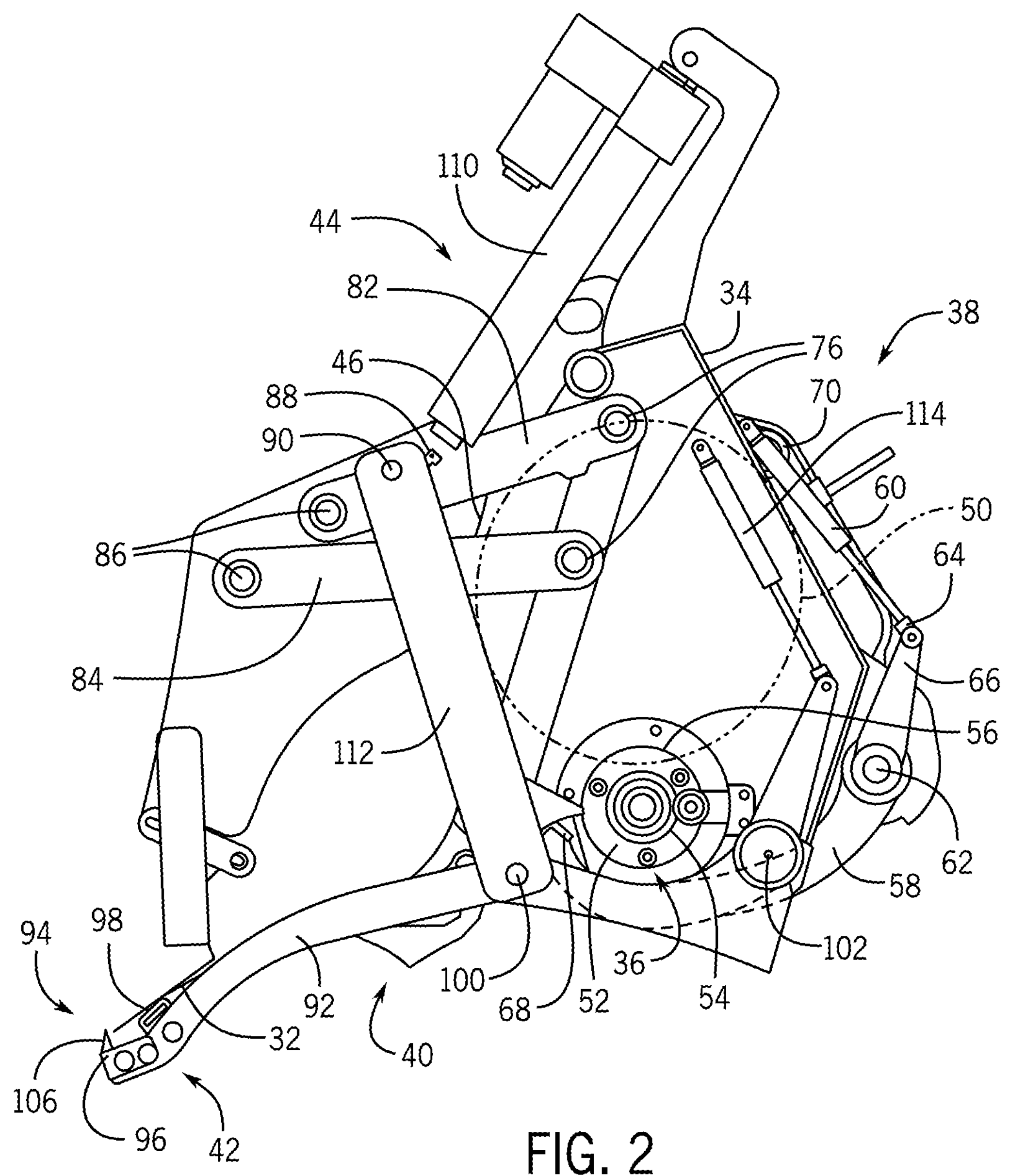
FIG. 2 is the web wrap apparatus of FIG. 1 depicted in a waiting position.

The web wrap apparatus 18 is visible in more detail in FIG. 2 and contains among other things a housing 34, a motion element 36, a brake device 38, a feeder 40, a separator 42 and an actuating mechanism 44.

The housing 34 is located in the front upper part of the round baler 10 between or substantially between the side walls 26 and has a rear wall 46 and a left and a right wall 48 connected to one another and suitable to be connected to the side walls 26.

Depending on the width of the web 32, the housing 34 and the entire web wrap apparatus 18 may extend beyond the side walls 26. The rear wall 46 may be of a material or may have a layer which creates a certain friction, which will have an influence on the rolling resistance of a roll 50 of the web 32. The housing 34 may be used to attach all components and parts of the web wrap apparatus 18 to it to form an autonomous unit. The right and left walls 48 extend to the rear towards the bale chamber 16 as is needed to take up some of the parts described later.

The motion element 36 is formed by a roll 52, preferably rubber coated, which is journalled rotatably about a horizontal axis in the walls 48 and which is located such, that the roll 50 of the web 32 can rest on it. At least with one end portion, the roll 52 extends beyond the walls 48 and possibly even beyond the side walls 26 and is provided with a yieldable clutch 54, which may be a slip clutch, a rubber block between a flange and the roll 52 or the like. The clutch 54 has several—in this case three—actuators 56 evenly distributed on the circumference of a disc rotating with it; yet one would be sufficient. The actuators 56 may be stops, noses, or the like protruding radially, but it may also be grooves or notches in the circumference. When viewing the drawing, the roll 52 has about the same diameter as the clutch 54. As is known, but not shown here, the roll 52 is connected via a chain drive and a free-wheel to the pressing elements 24 such that it must rotate slower than the pressing elements 24.

The brake device 38 substantially has a control arm 58 and a brake arm 60 connected together by a shaft 62 to pivot about a horizontal axis of the latter. Also a gas spring 64 is connected to the shaft 62 via an arm 66 to assist or resist its rotational movement. It is the purpose of the brake device 38 to exert a certain pressure on the roll 50 of the web 32 to assure a sufficient tension in it, when it is wrapped onto a bale (not shown). The shaft 62 is located at about the same height as the roll 52 and at a certain distance to it forwardly. The control arm 58 extends underneath the roll 52 to a side opposite to the shaft 62 and ends at about the center of the roll 52. The control arm 58 has an idler bar 68 or an angle extending parallel to the axis of roll 52 between the walls 48. The brake arm 60 extends from the shaft 62 to a location above a completely wrapped roll 50 of the web 32 and has a cross element 70 designed to push onto the circumferential surface of the roll 50, thereby pressing the roll 50 against the rear wall 46 and creating the wanted rolling resistance. As is apparent from the drawing, a downward, counter-clockwise movement of the control arm 58 will provoke a counter-clockwise movement of the brake arm 60 upon the roll 50 of the web 32.

Figure 3:
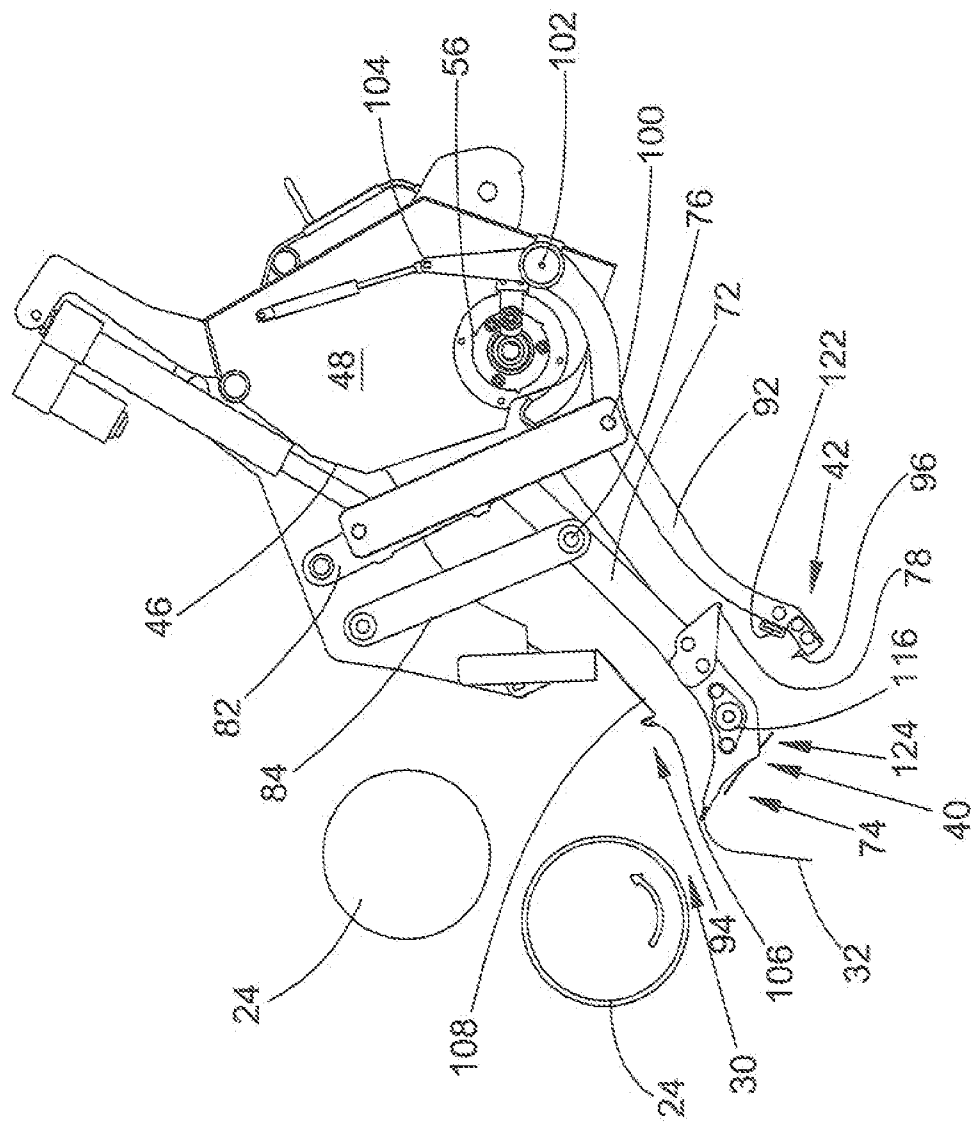
FIG. 3 is the web wrap apparatus of FIG. 1 depicted in an intermediate position.

The feeder 40 in this embodiment (see also FIG. 3) is formed as a so-called duckbill, which however is not mandatory; it could be any other moving part pulling the web 32 from the roll 50 and feeding it into the bale chamber 16 through the gap 30. The feeder 40 is composed of struts 72 on each side holding between them a carrier 74 in the form of a mouthpiece at a lower end thereof, two vertically distant bearings 76 in an upper region and a driver 78 positioned between the carrier 74 and the lower bearing 76 at the side of the strut 72 opposite of the carrier 74. The carrier 74 as such is known and has two opposite plates biased onto each other to clamp a piece of the web 32 and move it forward. An upper link 82 and a lower link 84 forming part of a parallelogram linkage are connected with one end area to the bearings 76 and with their other end areas to the bearings 86 on the walls 48 being offset horizontally as well as vertically; lines through the bearings 76 at one end and bearings 86 at the other end do not run parallel, but divergently. The upper link 82 has an eye 88 on its upper side or a bore or the like useful to provide a connection to another part, as well as a journal 90, which in this case, but not necessarily, is located between the eye 88 and the bearing 86. An idler element 116 is connected to and connects the struts 72 on both sides and is provided between the carrier 74 and the driver 78. As can be seen in FIG. 3 this idler element 116 assists in feeding the web 32 in a proper way into the carrier 74. The idler element 116 may consist of a simple bar or shaft.

The separator 42 has two substantially S-shaped, but almost horizontally oriented arms 92 and a counter element 94, which both serve to cut or separate a portion of the web 32 wound around a bale from a portion remaining on the roll 50. In their rear end areas, shown at the left in the drawing and facing the bale chamber 16, the arms 92 carry an upwardly oriented separating edge 96 or knife and a rubber block 122, which is oriented the same way, but provided with respect to the separating edge 96 opposite of the bale chamber 16 and which forms one part of a retainer 98. A bearing 100 is located substantially in the transition area between the two curves of the "S" and is followed by a bearing 102 at about ⅔ of the remaining length of the second curve and a bearing 104 at the end of the arms 92. The counter element 94 is formed of bent sheet metal, which in this case is flexible to some extent and has a notch 106, into which the separating edge 96 may enter and a plate 108 or surface, which is positioned such, that it can be contacted by the rubber block 122, when the separator 42 is moved against it. The counter element 94 is attached to the walls 48 and located close to the gap 30. The plate 108 forms another part of the retainer 98.

The actuating mechanism 44 includes a motor 110, a link 112 and a spring 114. The motor 110, which may be actuated electrically, hydraulically or pneumatically is connected with one side to the walls 48 or any other stationary feature of the chassis 12 and with the other side to the eye 88 on the upper link 82. The link 112 is a straight rigid bar extending between and connecting the bearings 90 on the upper link 82 and the bearing 100 on the arms 92. The spring 114 is formed as a gas spring, but could be of any other kind, and is connected at one end to the walls 48 and at the opposite end to the bearing 104 at the end of the arms 92.

Connected to the clutch 54 and thus to the roll 52 are three indicators 128 rotating with the roll 52, once the web 32 is pulled from the roll 50. A sensor 126 is located close to the travel path of these indicators 128 to sense their movement. These indicators 128 are offset angularly with respect to the actuators 56.

Figure 7:
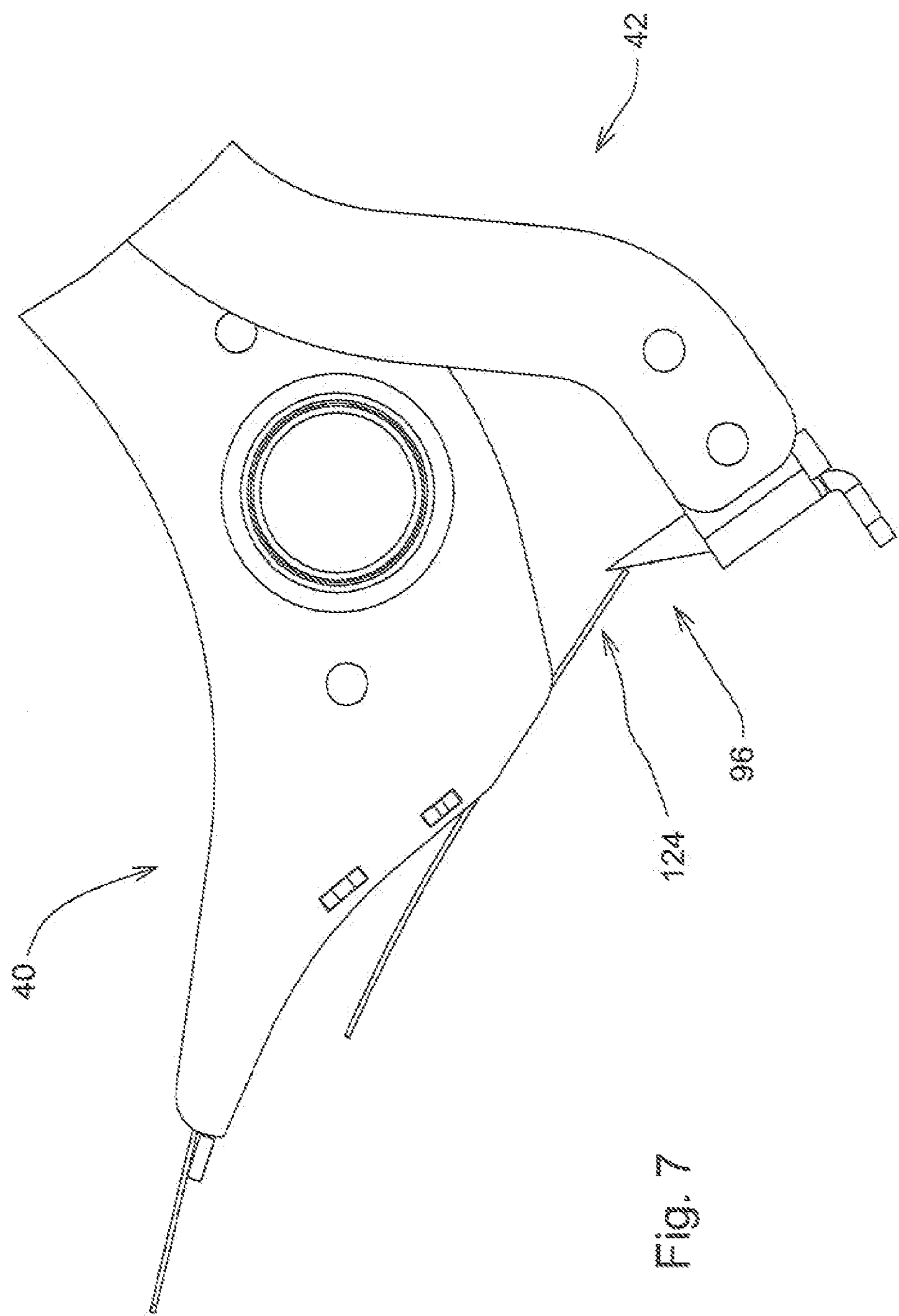
FIG. 7 is a feeder with a stripper and a separator close to one another in side view.
Figure 8:
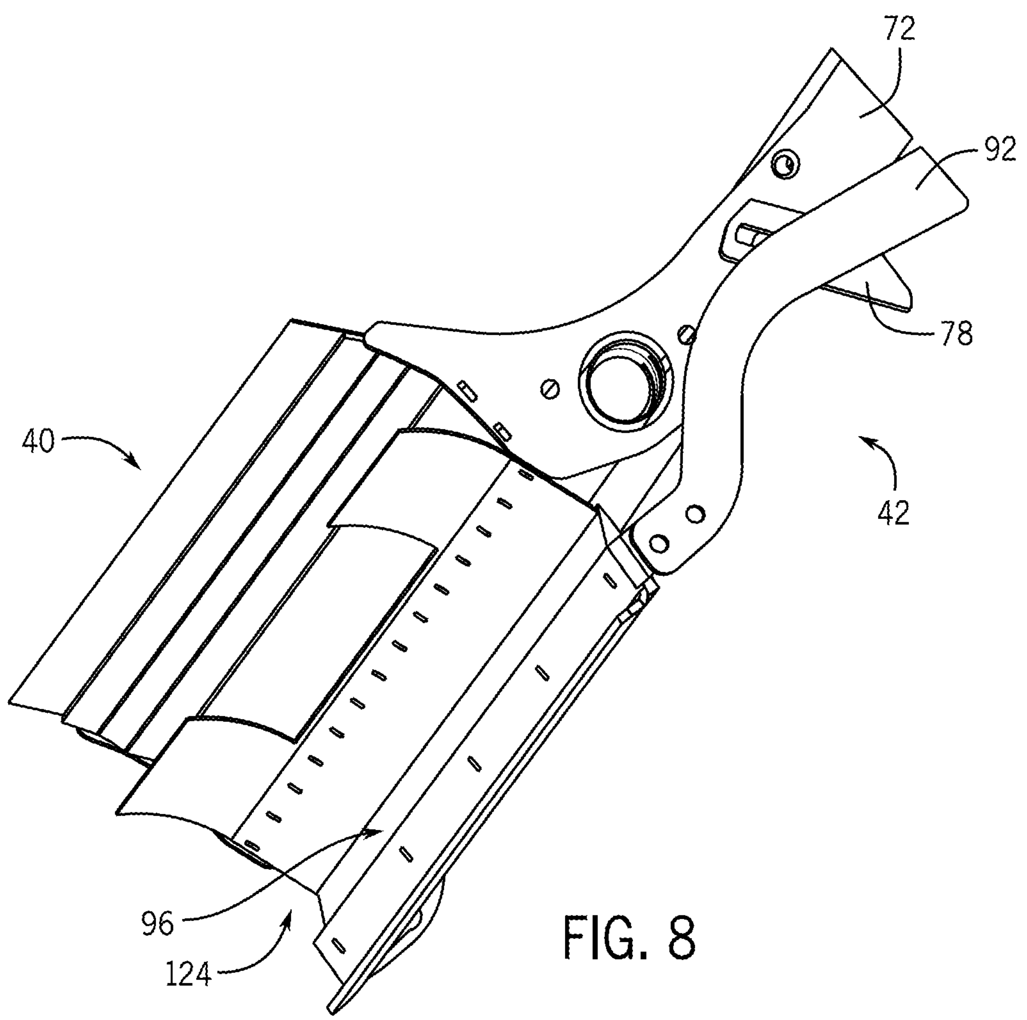
FIG. 8 is the feeder and separator of FIG. 7 in perspective view.

FIG. 7 shows the feeder 40 and the separator 42 in a side view, whereas at the underside of the carrier 74 a stripper 124 is attached. The stripper 124 is made of plastic and bolted, glued, riveted, snapped or otherwise fastened to the carrier 74. The stripper 124 extends from the lower edge of the carrier 74 forward at a length, which is sufficient to reach the separating edge 96 when the feeder 40 and the separator 42 are moved relative to one another, as is shown in FIGS. 7 and 8. The length of the stripper 124 is chosen such, that it not only touches the tip of the separating edge 96, but strips along a slanted surface terminating in the tip. As is apparent from the drawing, the stripper 124 will also strip along the opposite side of the separating edge 96, when the feeder 40 moves from its position in FIG. 2 to that of FIG. 3. The stripper 124 extends over the full length of the separating edge 96.

Based on this structural description the function is described as follows starting from a state shown in FIG. 2, in which the web wrap apparatus 18 waits to be operated. In a state as shown in FIG. 2, the roll 50 with the web 32 is placed on the roll 52 and is secured in its position between the cross element 70 and the rear wall 46. The arms 92 rest against the counter element 94 and the feeder 40 is in a position remote from the gap 30. The web 32 extends from the roll 50, underneath the roll 52 over the idler bar 68, through the carrier 74 to a location between the separating edge 96 and the notch 106, whereas it is clamped between the plate 108 and the rubber block 122 at a place slightly upstream of it. The driver 78 rests against the actuator 56 to keep the roll 52 from rotating.

Figure 9:
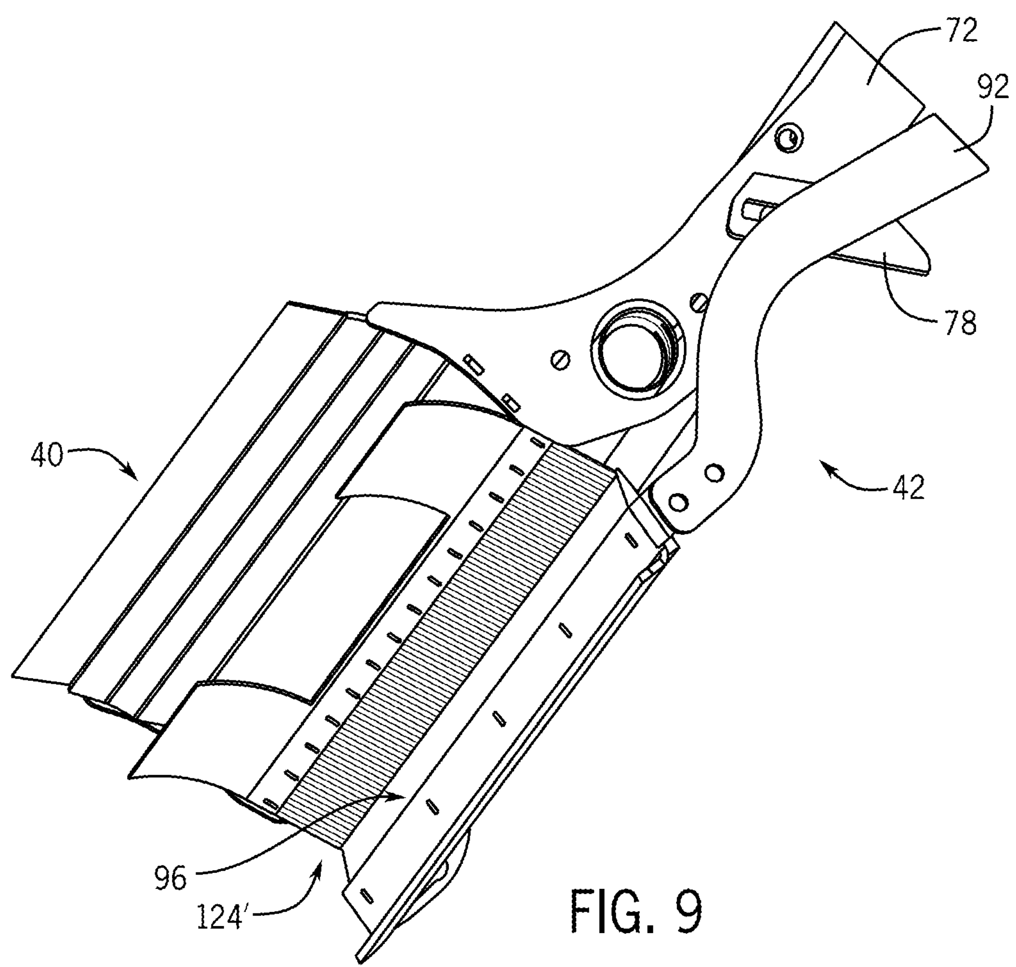
FIG. 9 is another version of the feeder and separator as shown in FIG. 8 with an alternate stripper.

FIG. 9 shows another embodiment of the feeder 40 and the separator 42 in which a stripper 124' is in the form of a brush, which can be made of Nylon fiber bristles or the like. Like the stripper 124, the bristles of the brush stripper 124' can be mounted to the carrier 74 and can extend from the lower edge of the carrier 74 a length sufficient to reach the separating edge 96 when the feeder 40 and the separator 42 are positioned as shown in FIG. 9. Also, the brush stripper 124' can extend along the full length of the separating edge 96. The brush stripper 124' has the advantage of being highly flexible, less sensitive to varying dimensions, and may provide a stronger cleaning effect, since the many bristles of the brush effectively provide a multitude of individual strippers.

Figure 4:
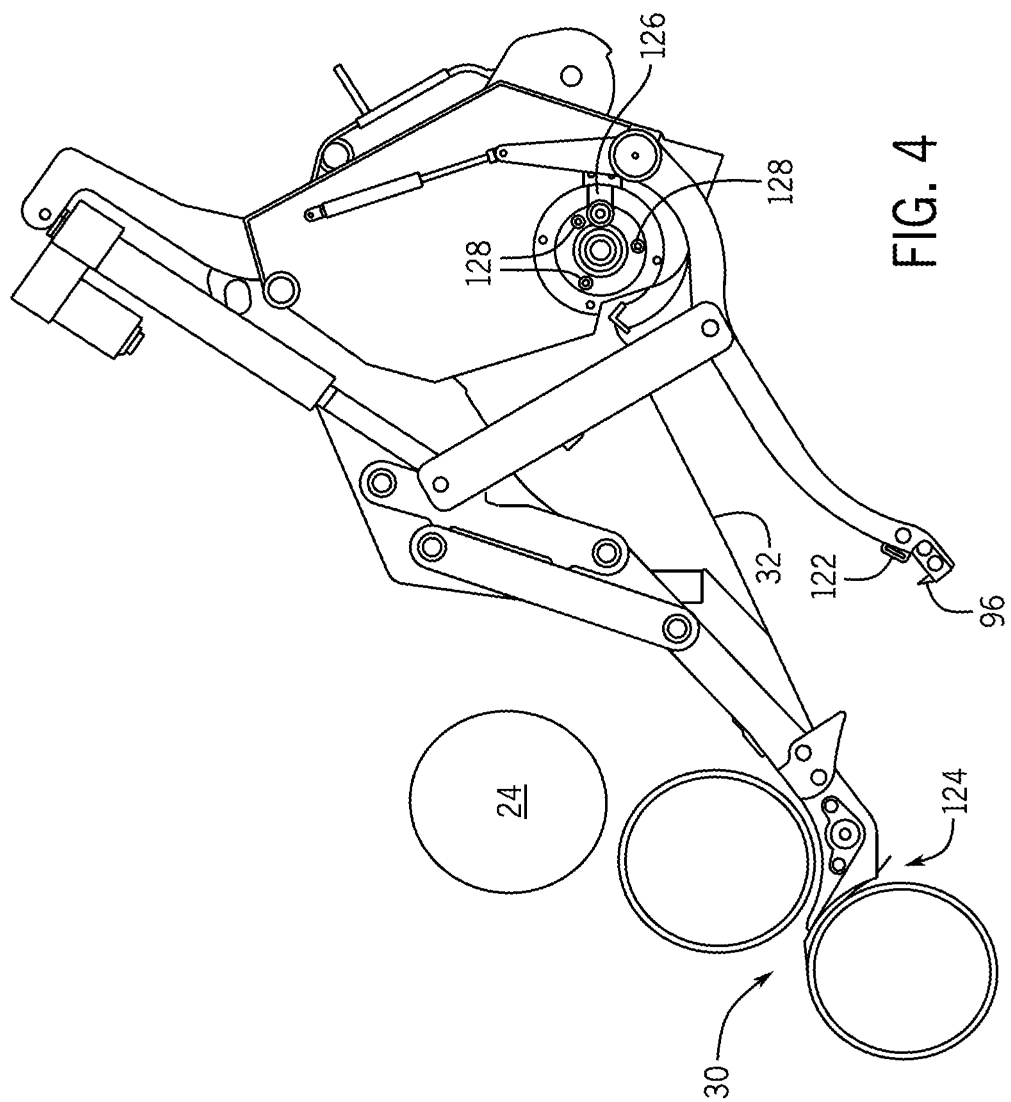
FIG. 4 is the web wrap apparatus of FIG. 1 depicted in a feeding position.
Figure 5:
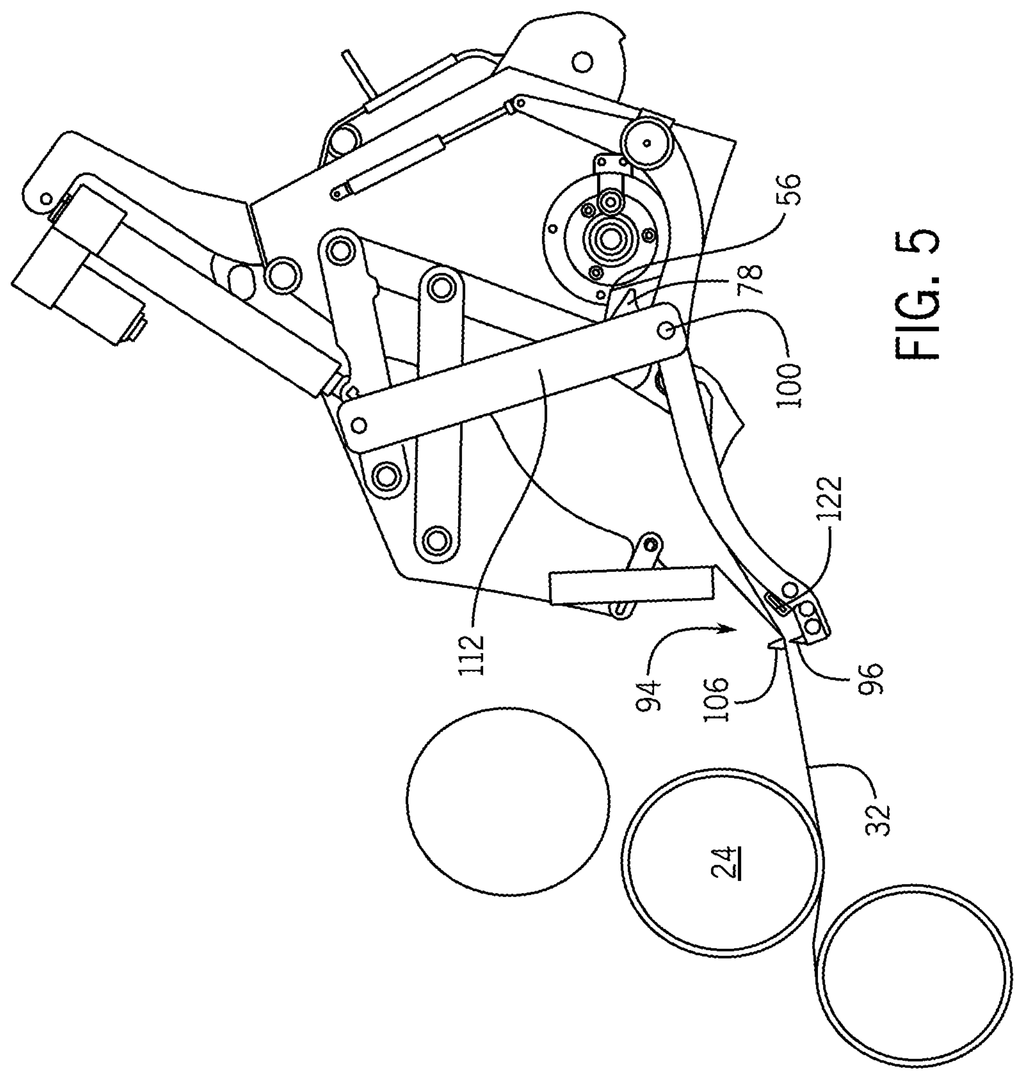
FIG. 5 is the web wrap apparatus of FIG. 1 depicted in a partly retracted position.
Figure 6:
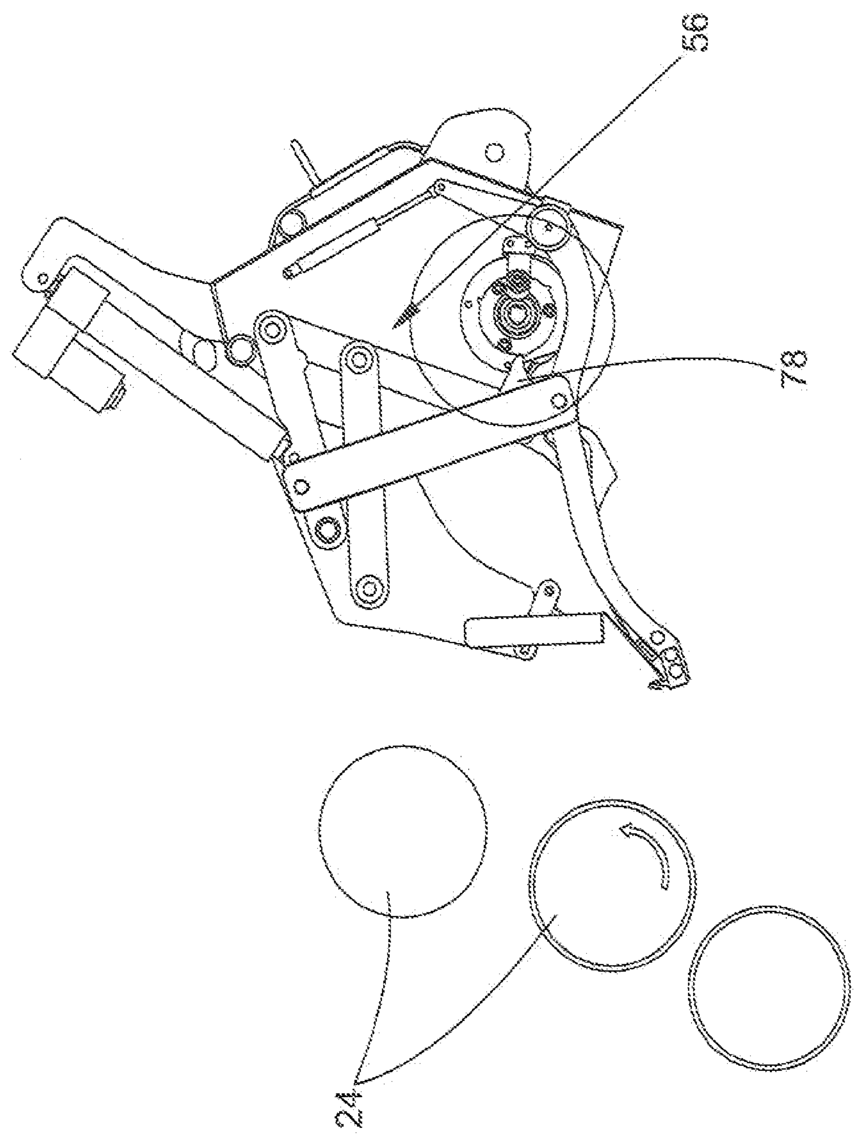
FIG. 6 is the web wrap apparatus of FIG. 1 depicted in a fully retracted position.

As soon as a manual or electrical signal is given to the actuating mechanism 44 to initiate wrapping the web 32 around a bale, the motor 110 is extended, thereby moving the arms 92 away from the counter element 94, moving the feeder 40 downward and towards the gap 30, which releases the driver 78 from the actuator 56. FIG. 3 shows, that the separator 42 moves away sufficiently to allow the feeder 40 to enter the gap 30. Once the carrier 74 protrudes the gap 30, the web portion hanging down from the carrier 74 is caught by the rotating bale and pulled from the roll 50. Tension is created in the web 32, since the roll 50 experiences friction on the wall 46 and since the roll 52 is hindered from free movement. According to FIG. 4 the web 32 is inserted into the gap 30 and caught by the rotating bale. FIG. 5 shows a situation, in which the motor 110 is retracted and thereby the feeder 40 is on its way back to a resting position and the driver 78 approaches the actuator 56. Dimensions, locations and arrangements of the feeder 40 and the separator 42 are chosen such, that in the situation of FIG. 5, shortly before the web 32 is separated, the web 32 is pulled over the rubber block 122 at one side and over the counter element 94 on its other side, but not or hardly over the tip of the separating edge 96. This helps to avoid unnecessary wear on the separating edge 96, premature tearing of the web 32 and thus achieves a clean cut or separation of the web 32. As a next step the driver 78 engages the actuator 56, which rotates together with the roll 52. As a result the link 112 is abruptly kicked upwardly, which assists the upward movement of the arms 92 initiated by the motor 110, and the spring 114. In order to dampen the shock on the roll 52 either the clutch 54 allows a slipping movement or if the clutch 54 contains rubber blocks or the like, the driver 78 will be accelerated by the first compressed and then expanding rubber. As a further consequence and as is shown in FIG. 6 the accelerated separating edge 96 presses the web 32 into the notch 106 and clamps it as well between the rubber block 122 and the plate 108, which increases tension in the web portion connected to the bale and finally leads to its separation. The piece of the web 32 extending from the separating edge 96 to the carrier 74 is the one hanging down, when wrapping starts again.

Having described the preferred embodiment, it will become apparent that various modifications can be made without departing from the scope of the invention as defined in the accompanying claims.

The invention claimed is:

1. A web wrap apparatus for use in a baler, said baler having a pick-up mechanism for delivering material to a bale chamber in which the material delivered to the bale chamber is wrapped with a web material, the web wrap apparatus comprising:

an actuator mechanism;

a feeder moved by the actuator mechanism between retracted and feed positions, the feeder having a carrier configured to clamp against opposite sides of the web material to carry the web material with respect to the bale chamber;

a separator having a separator edge, the separator being movable with respect to the feeder such that a tip of the separator edge can be brought into engagement with the web material carried by the carrier to sever the web material; and a stripper mounted to the carrier and configured to engage the separator edge during movement of the feeder between the retracted and feed positions;

wherein, when the feeder is moved in a first direction between the retracted and feed positions, the stripper engages the tip of the separator edge and a slanted surface terminating in the tip, and, when the feeder is moved in a second, opposite direction between the retracted and feed positions, the stripper engages the tip of the separator edge and a side of the separator edge opposite the slanted surface.

2. The web wrap apparatus of claim 1, wherein the feeder has struts on each side of the carrier and the separator has arms that carry the separator edge; and wherein the struts are pivotal with respect to the arms.

3. The web wrap apparatus of claim 2, wherein the struts are pivotally coupled to the arms by a link assembly.

4. The web wrap apparatus of claim 3, wherein the link assembly includes an upper link and an actuator link, the upper link being pivotally connected at one end to an associated one of the struts and pivotally connected at an opposite end to a housing of the web wrap apparatus.

5. The web wrap apparatus of claim 4, wherein the feeder and the separator are moved by the actuator mechanism.

6. The web wrap apparatus of claim 5, wherein the actuator mechanism includes a spring member and the actuator link; and wherein the actuator link is pivotally connected to the upper link and to an associated one of the arms.

7. The web wrap apparatus of claim 1, wherein the stripper engages the separator edge along its full width.

8. The web wrap apparatus of claim 7, wherein the stripper is one of a sheet member and a brush.

9. A baler, comprising:

a bale chamber;

a pick-up mechanism for delivering material to the bale chamber;

a supply of web material;

a web wrap apparatus configured to wrap the material delivered to the bale chamber with the web material, the web wrap apparatus comprising:

an actuator mechanism;

a feeder moved by the actuator mechanism between retracted and feed positions, the feeder having a carrier configured to clamp against opposite sides of the web material and carry the web material with respect to the bale chamber;

a separator having a separator edge, the separator being movable with respect to the feeder such that a tip of the separator edge can be brought into engagement with the web material carried by the carrier to sever the web material; and a stripper mounted to the carrier and configured to engage the separator edge during movement of the feeder between the retracted and feed positions;

wherein, when the feeder is moved in a first direction between the retracted and feed positions, the stripper engages the tip of the separator edge and a slanted surface terminating in the tip, and, when the feeder is moved in a second, opposite direction between the retracted and feed positions, the stripper engages the tip of the separator edge and a side of the separator edge opposite the slanted surface.

10. The baler of claim 9, wherein the feeder has struts on each side of the carrier and the separator has arms that carry the separator edge; and wherein the struts are pivotal with respect to the arms.

11. The baler of claim 10, wherein the struts are pivotally coupled to the arms by a link assembly.

12. The baler of claim 11, wherein the link assembly includes an upper link and an actuator link, the upper link being pivotally connected at one end to an associated one of the struts and pivotally connected at an opposite end to a housing of the web wrap apparatus.

13. The baler of claim 12, wherein the feeder and the separator are moved by the actuator mechanism.

14. The baler of claim 13, wherein the actuator mechanism includes a spring member and the actuator link; and wherein the actuator link is pivotally connected to the upper link and to an associated one of the arms.

15. The baler of claim 9, wherein the stripper engages the separator edge along its full width.

16. The baler of claim 15, wherein the stripper is one of a sheet member and a brush.

17. The baler of claim 9, wherein the supply of web material is a web wrapped roll about which the web material is wound.

18. The baler of claim 17, further including a motion roll positioned and configured to engage the web material and unwind the web material from the web wrapped roll.

19. The baler of claim 18, further including a brake device configured to tension the web material on the web wrapped roll.

* * * * *